(12) United States Patent
Muth et al.

(10) Patent No.: US 11,732,155 B2
(45) Date of Patent: Aug. 22, 2023

(54) EPOXY CASTING RESIN FORMULATION

(71) Applicant: 3M INNOVATIVE PROPERTIES COMPANY, St. Paul, MN (US)

(72) Inventors: Mathis A. Muth, Essen (DE); Michael Petry, Dinslaken (DE); Adrian T. Jung, Kaarst (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 775 days.

(21) Appl. No.: 16/485,871

(22) PCT Filed: Dec. 8, 2017

(86) PCT No.: PCT/IB2017/057751
§ 371 (c)(1),
(2) Date: Aug. 14, 2019

(87) PCT Pub. No.: WO2018/167551
PCT Pub. Date: Sep. 20, 2018

(65) Prior Publication Data
US 2019/0390080 A1 Dec. 26, 2019

(30) Foreign Application Priority Data

Mar. 16, 2017 (EP) .................................. 17161430

(51) Int. Cl.
| | | |
|---|---|---|
| *C09D 163/00* | (2006.01) | |
| *C09D 7/65* | (2018.01) | |
| *C09D 7/61* | (2018.01) | |
| *C09D 7/41* | (2018.01) | |
| *B29C 39/00* | (2006.01) | |
| *B29C 39/18* | (2006.01) | |
| *H02G 1/14* | (2006.01) | |
| *H02G 15/08* | (2006.01) | |
| *B29K 63/00* | (2006.01) | |
| *B29K 105/00* | (2006.01) | |
| *B29K 505/02* | (2006.01) | |
| *B29L 31/34* | (2006.01) | |

(52) U.S. Cl.
CPC .......... *C09D 163/00* (2013.01); *B29C 39/003* (2013.01); *B29C 39/18* (2013.01); *C09D 7/41* (2018.01); *C09D 7/61* (2018.01); *C09D 7/65* (2018.01); *H02G 1/145* (2013.01); *H02G 15/08* (2013.01); *B29K 2063/00* (2013.01); *B29K 2105/0032* (2013.01); *B29K 2505/02* (2013.01); *B29L 2031/3462* (2013.01)

(58) Field of Classification Search
CPC ...... C08G 59/621; C08G 59/00; C08G 59/54; C08G 59/50; H02G 15/08; H02G 1/145; C09D 7/61; C09D 163/00; C09D 7/65; C09D 7/41; B29C 39/003; B29C 39/18; B29L 2031/3462; B29K 2063/00; B29K 2105/0032; B29K 2505/02
See application file for complete search history.

(56) References Cited

U.S. PATENT DOCUMENTS

| | | | |
|---|---|---|---|
| 3,030,329 A | 4/1962 | Warnsdorfer, Jr. | |
| 8,815,608 B2 | 8/2014 | John et al. | |
| 8,975,312 B2 | 3/2015 | Jung | |
| 9,228,040 B2 | 1/2016 | Pinto et al. | |
| 2004/0048954 A1 | 3/2004 | Thieben | |
| 2013/0096234 A1* | 4/2013 | Jung ..................... | C09J 163/00 523/400 |
| 2016/0017172 A1* | 1/2016 | Thorlaksen .............. | B05D 1/02 427/407.1 |
| 2017/0292050 A1* | 10/2017 | Burckhardt ............. | C08L 75/08 |

FOREIGN PATENT DOCUMENTS

| | | |
|---|---|---|
| DE | 10115004 | 10/2002 |
| EP | 2495271 | 4/2014 |
| EP | 2818492 | 4/2018 |
| GB | 975702 | 11/1964 |
| JP | 56-036540 | 4/1981 |
| WO | WO 2000-001659 | 1/2000 |
| WO | WO 2005-030853 | 4/2005 |
| WO | WO 2012-003204 | 1/2012 |
| WO | WO 2013-159279 | 10/2013 |
| WO | WO 2015-077918 | 6/2015 |

OTHER PUBLICATIONS

Hellermann Tyton "Two-component Polyurethane Cast Resin: Resin-33-BBULK, Article No. 435-00901", 2019, [retrieved from the internet on Aug. 29, 2019], URL <https://www.hellermanntyton.com/in/products/cast-resin-technology/resin-33-b-bulk/435-00901>, 4 pages.
Zuckerman, Colors for Foods, Drugs and Cosmetics, Encyclopedia of Chemical Technology, 1949, vol. 4, pp. 287-313.
Extended EP Search Report for EP Application No. 17161430.8, dated Jun. 28, 2017, 8 pages.
International Search Report for PCT International Application No. PCT/IB2017/057751, dated Feb. 6, 2018, 5 pages.

* cited by examiner

*Primary Examiner* — Vishal V Vasisth
(74) *Attorney, Agent, or Firm* — 3M Innovative Properties Company

(57) ABSTRACT

The present disclosure provides a curable casting resin precursor, comprising (a) a first part (A) comprising: (a1) at least one epoxy resin; (b) a second part (B) comprising: (b1) at least one first amine-based epoxy curing agent; (b2) optionally, at least one second amine-based epoxy curing agent; (b3) at least one mineral filler; (b4) at least one phenolic lipid; wherein part (A) and/or part (B) comprise at least one triphenylmethane dye. The curable casting resin precursor is suited for encapsulating metal parts such as cable joints and the like.

18 Claims, No Drawings

EPOXY CASTING RESIN FORMULATION

This application is a 371 of PCT/IB2017/057751 filed Dec. 8, 2017

FIELD

The disclosure relates to curable two-component epoxy resin precursors, more specifically to the field of epoxy casting resin precursors and the epoxy casting resin compositions obtained therefrom. In another aspect, the present disclosure relates to a method for encapsulating metal parts, in particular insulating a cable joint by using the two-component resin compositions as described herein. In still a further aspect, the present disclosure relates to the use of such two-component epoxy resin precursors and the epoxy casting resin compositions obtained therefrom.

BACKGROUND

Encapsulating metal parts such as joining cable parts together to from cable joints is a well-known part of installing cables for electricity in construction works for houses and roads, installation of electrical devices, and in the manufacture of vessels such as aircraft, trucks, ships and the like.

Usually, the plastic insulation parts or layers of the respective terminal ends of the cables are at least partially removed, the metal parts of the cables are joined by either twisting the cables together, welding the cable conductor ends together or using a metal connector. New electrically insulating material is then applied to provide mechanical protection and flexibility as well as protection against contamination by dirt and in particular moisture. Moreover, a lot of cases require that a certain flexibility of the cables and the corresponding cable joints, which means that also the newly formed cable joints need to be flexible to some extent.

While the use of self-adhesive tapes provides suitable insulating properties, in some cases, for several applications, in particular large, i.e. thick cables for low-voltage and/or high current loads in combination with highly demanding environments, additional protection is often required. Accordingly, it is common in the art to use casting resins which are poured into a cast or mold surrounding the cable joint and cured to provide the desired electrical insulation and the mechanical protection against exterior influences.

In this regard, polyurethane casting resins are a well-known class of two-part and room-temperature curing materials for applications such as low-voltage cable joints. Generally, these resins exhibit low viscosities and so that they are easy to mix and pour. The reaction of the components is generally fast with a suitable pot life (e.g. between 15 and 45 min at room temperature) with only little generation of exothermic heat. Furthermore, the cured resins exhibit the required toughness and flexibility for the above-mentioned applications.

However, while polyurethane casting resins exhibit properties advantageous for the application in cable joints, an inherent drawback exists in that the resins are sensitive to water. The hardener, which generally is an isocyanate-based compound, readily reacts with water to form carbon dioxide gas, which can lead to a foaming of the resin. Foaming cannot be tolerated in these applications, as this would result in an insufficient electrical insulation. To address this deficiency, current state-of-the-art polyurethane systems for electrical insulation are modified to increase the hydrophobicity of the system, which allows for curing in the presence of water. But even being considered as being hydrophobic, under certain circumstances for example when using resin pressure injection method foaming may still represent a problem.

Furthermore, the use of isocyanates may give rise to health and safety concerns for some customers and applications, since most of the isocyanates are considered carcinogenic material.

Apart from that, further properties desired for casting resins arise from the typical installation of cable joints and splices in construction works. In the case of a two-component casting resin composition, the two parts are mixed and the resulting composition is poured or transferred into the mold containing the cable joint. For example, repairing/splicing on an underground cable may involve the following steps: 1) A worker digs a hole to a damaged portion of the cable. 2) An electrician performs the actual work on the cable and after mixing the (until this point) two separate parts of the resin composition, pours the composition into the (in most cases transparent) mold body. In order to guarantee its important functions (electrical insulation and mechanical protection), the cable and the splice should not be moved until the resin is fully cured. However, temperature variations on the construction site can make it difficult to predict the actual curing time. 3) After the resin is fully cured, the underground worker may fill up the hole, thereby finishing the complete repair process.

Potential risks of this encapsulation procedure are insufficient mixing of the two parts of the resin mixture and/or movement of the cable and splice before the resin has fully cured. Either of these could lead to a failure of the joint with the consequence of the failure of the corresponding electrical system and, ultimately, a costly and time-consuming repair.

Accordingly, without contesting the technical advantages associated with the casting resin compositions known in the art, there is still a strong need for curable casting resin compositions suitable for electrical insulation and mechanical protection of cable joints.

Other advantages of the casting resins and methods of the present disclosure will be apparent from the following description.

SUMMARY

The present disclosure provides a curable casting resin precursor, comprising
(a) a first part (A) comprising:
  (a1) at least one epoxy resin;
(b) a second part (B) comprising:
  (b1) at least one first amine-based epoxy curing agent;
  (b2) optionally, at least one second amine-based epoxy curing agent;
  (b3) at least one mineral filler;
  (b4) at least one phenolic lipid;
wherein part (A) and/or part (B) comprise at least one triphenylmethane dye.

Additionally, the present disclosure provides a curable casting resin, obtained from combining part (A) and part (B) of the curable casting resin precursor as described herein.

The present disclosure further provides a method of insulating cable joints, the method comprising the following steps:
(a) Providing a curable casting resin precursor as described herein, (b) Combining parts (A) and (B) of the curable casting resin precursor so as to form a curable casting resin composition;
(c) Providing at least one metal part such as a cable joint comprising the joint of the metal parts of at least two different cables;
(d) Optionally, providing a cast around at least part of at least one metal part, such as the cable joint;
(e) Applying the curable casting resin composition to at least part of the at least one metal part such as the cable joint; and
(f) Allowing the curable casting resin composition to cure.

Furthermore, the present invention provides a kit for insulating cable joints, comprising
(i) a first container containing part (A) of the curable casting resin precursor as described herein and a second container containing part (B) of the curable casting resin precursor as described herein;
(ii) a casting chamber/mold dimensioned in a way to provide space for a cable joint and for mixing part (A) and (B) of the curable casting resin precursor such that the cable joint may be covered by a curable casting resin composition obtained from mixing part (A) and (B) of the curable casting resin precursor.

Finally, the present disclosure relates to the use of the curable casting resin precursor and the curable casting resin compositions as described herein for industrial applications, in particular for insulating cable joints.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt." or "wt.-%") unless specified otherwise. The amounts of all ingredients give 100% wt. unless specified otherwise. If the amounts of ingredients are identified by % mole the amount of all ingredients gives 100% mole unless specified otherwise.

In the context of the present disclosure, the terms "room temperature" and "ambient temperature" are used interchangeably and refer to a temperature of 23° C. (+2° C.) at ambient pressure condition of about 101 kPa.

Unless explicitly stated otherwise, all embodiments and optional features of the present disclosure can be combined freely.

The first aspect of the present disclosure is a curable casting resin precursor, comprising
(a) a first part (A) comprising:
(a1) at least one epoxy resin;
(b) a second part (B) comprising:
(b1) at least one first amine-based epoxy curing agent;
(b2) optionally, at least one second amine-based epoxy curing agent;
(b3) at least one mineral filler;
(b4) at least one phenolic lipid;
wherein part (A) and/or part (B) comprise at least one triphenylmethane dye.

Curable precursors as the one according to the present disclosure are also known as 2-component compositions or 2 k-compositions. It is understood that the first part (A) is physically separated from the second part (B) of the curable casting resin precursor. The first part (A) and second part (B) are mixed before the intended use according to the user's needs so as to obtain a curable casting resin composition. The present disclosure also covers a curable casting resin composition, obtained from the curable casting resin precursor and a cured cable joint obtained from curing the curable casting resin composition. The use of these 2 k-compositions offers several advantages such as a longer shelf-life, the possibility to form a curable composition according to the user's needs, and a readily curable composition which itself offers further handling advantages for the user, in particular in the technical field of insulating cable joints on-site.

The curable resin precursor according to the present disclosure may exhibit at least one or even a combination of desirable properties such as good handling properties (e.g. suitable viscosity and pot-life after mixing of the two parts, low exothermal heat during the curing reaction), good mechanical and electrical (e.g. insulating) properties of the cured casting resin. Low exothermal heat during the curing reaction is advantageous in that thermal damage to the insulation material of cables as well as danger to the worker handling the compositions may be avoided.

It has in particular been found that this is due to the specific and unique combination of a first part (A) comprising at least one epoxy resin, and a second part (B) comprising at least one first amine-based epoxy curing agent, at least one second amine-based epoxy curing agent, at least one mineral filler and at least one phenolic lipid. In addition, the presence of the triphenylmethane dye in part (A) and/or part (B) allows a visual indication of the correct mixing of part (A) and part (B) and/or monitoring of the curing of the casting resin. This is particularly advantageous when using the curable casting resin precursor as described herein for insulating cable joints and splices.

Part (A) of the curable casting resin precursor comprises at least one epoxy resin. Suitable epoxy compounds for use herein will be easily identified by those skilled in the art, in the light of the present description.

The epoxy resin for use herein is not particularly limited. Epoxy resins are polymers having one or more epoxy-functionality. Typically but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake cross-linking reactions. The epoxy resins may have an average epoxy-functionality of at least 1, greater than one, or of at least 2.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethyl methane, dihydroxydiphenylmethylpropylmethane, dihydroxydiphenylethylphenyl-methane, dihydroxydiphenylpropylenphenylmethane, dihydroxydiphenylbutylphenyl-methane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by the formula below wherein n denotes the repeating unit (in case of n=0 the formula below represents the diglycidyl ether of bisphenol A):

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example acyclic, linear or branched, epoxy resins may be used.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). The epoxy resins may contain halogens, preferably bromine atoms to make them less flammable.

Examples of suitable and commercially available epoxy resins include diglycidylether of bisphenol A (available under the trade designation EPON 828, EPON 830, EPON 1001 or EPIKOTE 828 from Hexion Speciality Chemicals GmbH, Rosbach, Germany, or under the trade designation D.E.R. 331 or D.E.R. 332 from Dow Chemical Co,); diglycidyl ether of bisphenol F (e.g. EPICLON 830 available from Dainippon Ink and Chemicals, Inc. or D.E.R. 354 from Dow Chemical Co, Schwalbach/Ts., Germany); diglycidyl ethers of a blend of bisphenol A and bisphenol F (e.g. EPIKOTE 232 available from Momentive Speciality Chemicals, Columbus, USA). Other epoxy resins based on bisphenols are commercially available under the trade designations EPILOX (Leuna Epilox GmbH, Leuna, Germany); flame retardant epoxy resins are available under the trade designation D.E.R. 580 (a brominated bisphenol type epoxy resin available from Dow Chemical Co.). Cycloaliphatic epoxy resins are commercially available under the trade designation EPINOX (Hexion Specialty Chemicals GmnbH).

Epoxy compounds which are useful in the casting resin compositions according to the present disclosure are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or therebetween. More preferably, the organic epoxies are selected from the group comprising diglycidyl ethers of bisphenol A and bisphenol F and epoxy novolacs. Epoxy resins based on bisphenol A and bisphenol F resins and mixtures thereof are particularly preferred.

The use of epoxy resins in curable casting resins as described herein offers advantages over polyurethane casting resins for applications like in low voltage cable joints. For instance, the resulting casting resins are usually low in viscosity and therefore are easy to mix and pour. Additionally, in contrast to polyurethane-based casting resin precursor mixtures, the present epoxy-resin based casting resin

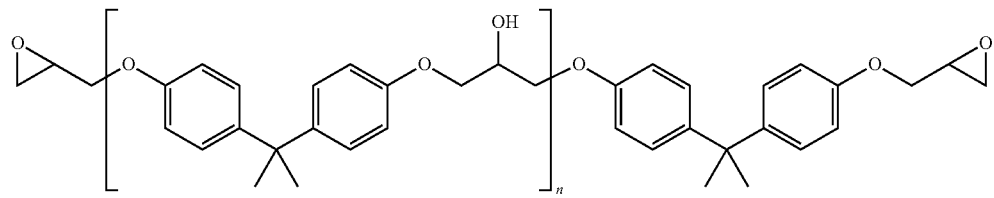

Typically, the epoxy resins are blends of several resins. Accordingly, n in the formula above may represent an average value of the blend, and may not be an integer but may include values like, for example and not limited thereto, 0.1 to 2.5.

precursor is not sensitive towards water, which represents an advantage for the user of these precursors. Apart from that, the use of isocyanates may also be avoided, which is yet another advantage with regard to the application of the casting resins.

Suitable exemplary epoxy compounds for use herein are commercially available from Momentive under tradename Epikote™ 828; from Dow Chemical Co. under tradename DER 331, DER 332, DER 334 and DER 351; from Resolution Performance Products under tradename Epon® 828; from Polysciences, Inc. under tradename Epon® 825/826/830/834/863/824; from Hexion under tradename Bakelite® EPR 164; from Huntsman under tradename Araldite® GY 250/260; or from Leuna Harze under tradename EPILOX® A 1900.

Preferably, part (A) of the curable casting resin precursor as described herein contains the at least one epoxy resin in an amount of from 60 to 100 wt.-%, preferably from 65 to 100 wt.-%, more preferably from 70 to 100 wt.-%, based on the total weight of part (A).

Part (B) of the curable casting resin precursor according to the present disclosure comprises the amine-based epoxy curing agents.

Epoxy curing agents suitable for use in the present disclosure are compounds which are capable of cross-linking (curing) the epoxy resin. Suitable curing agents according to the present invention are amine-based, e.g. they may be primary or secondary amines. The epoxy curing agent system present in part (B) comprises at least one first epoxy curing agent and preferably at least one second epoxy curing agent which is distinct (i.e. chemically different) from the first epoxy curing agent.

The at least one first epoxy curing agent comprises at least one primary and/or at least one secondary amine functionality. Preferably, the at least one first epoxy curing agent is a cardanol-based compound, preferably a phenalkamine. Phenalkamines may be obtained from a Mannich reaction of cardanol, formaldehyde, an at least one amine. The use of a phenalkamine as the at least one first amine-based epoxy curing agent may give rise to at least one effect desirable for the application of the curable casting resin precursor, such as low temperature curing ability and good pot life of the curable casting resin, as well as good chemical and moisture resistance, surface tolerance and salt water resistance of the cured casting resin. Phenalkamines useful as at least one first amine-based epoxy curing agents according to the present disclosure may be obtained, e.g., from Cardolite Corporation under the trade designation NX 5607.

Part (B) of the curable casting resin precursor as described herein contains the at least one first amine-based epoxy curing agent resin in an amount of from 10 to 45 wt.-%, preferably from 12.5 to 40 wt.-%, more preferably from 15 to 35 wt.-%, based on the total weight of part (B).

It is preferred that the part (B) of the curable casting resin precursor according to the present disclosure further comprises at least one second amine-based epoxy curing agent. This may have the effect of improved curing behaviour of the curable casting resin and/or improved mechanical properties of the cured casting resin obtained therefrom.

The at least one second epoxy curing agent for use herein may comprise at least one polyether amine and have an amine equivalent weight (AEW) of at least 55 grams per mole of amine equivalents. In that context, the at least one second epoxy curing agent for use herein may be any aliphatic, cycloaliphatic, linear, branched or aromatic polyether amine provided it meets the (AEW) requirement mentioned above.

Without wishing to be bound by theory, it is believed that the at least one second epoxy curing agent comprising at least one polyether amine and having an amine equivalent weight of at least 55 grams per mole of amine equivalents provides excellent chemical resistance after curing with the epoxy resin.

In particular aspect, the at least one second epoxy curing agent for use herein may comprise the general structure:

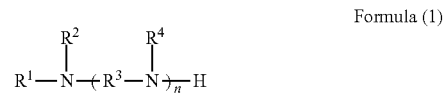

Formula (1)

$$R^1-N-(R^3-N)_n-H$$
$$\phantom{R^1-N-}|\phantom{(R^3-N)_n}|$$
$$\phantom{R^1-N-}R^2\phantom{(R^3-}R^4$$

wherein
the residues $R^1$, $R^2$, and $R^4$, independently from each other, may represent hydrogen or a hydrocarbon (such as an alkyl) or an alkoxy or a polyoxyalkyl residue containing about 1 to 15 carbon atoms;
$R^3$ represents a polyether alkyl residue, preferably containing about 1 to 15 carbon atoms;
n represents any integer from 1 to 10.

In a preferred aspect, the residues $R^1$, $R^2$, and $R^4$ are chosen such that the amine contains at least one or two primary amine groups.

In a particular aspect, the at least one second epoxy curing agent is a polyether amine having one or two or more primary amine moieties. The polyether amine may have from 1 to 12, or even from 1 to 6 catenary ether (oxygen) atoms.

In a preferred aspect, the at least one second epoxy curing agent comprises at least one polyether amine derived from polypropylene oxide or polyethylene oxide. Exemplary polyether amines suitable for use herein are commercially available under the trade designation JEFFAMINE from Huntsman Chemicals, or TTD (4,7,10-trioxatridecane-1,13-diamine) commercially available, for example, from BASF, Ludwigshafen Germany. In a further preferred aspect, an adduct of the at least one polyether amine derived from polypropylene oxide or polyethylene oxide with an epoxy resin is used as at least one second epoxy curing agent. For example, an adduct of TTD (in excess) with a commercially available epoxy resin such as Epon 828 may be advantageously used, as long as the adduct has an amine equivalent weight of at least 55 grams per mole of amine equivalents. The adduct of TTD with said epoxy resin may be readily prepared by procedures well-known to the skilled person, e.g. by mixing TTD and epoxy resin and keeping the mixture for about one hour at elevated temperatures such as about 100° C.

In a further preferred embodiment, the at least one second epoxy curing agent comprises a polyamidoamine. The polyamidoamine may be branched or unbranched aromatic or branched or unbranched aliphatic. Preferably, the polyamidoamine is an aliphatic polyamidoamine.

Accordingly, the at least one second epoxy curing agent may either comprise at least one compound according to formula one, at least one adduct of TTD with an epoxy resin and/or at least one polyamidoamine, and any combinations thereof.

Preferably, part (B) of the curable casting resin precursor as described herein contains the at least one second amine-based epoxy curing agent at least one second amine-based epoxy curing agent in an amount of from 0.5 to 20 wt.-%, preferably from 1 to 15 wt.-%, more preferably from 1.5 to 10 wt.-%, based on the total weight of part (B).

It is further preferred that the ratio of the at least one first epoxy curing agent and the at least one second epoxy curing agent is in the range of from 100:1 to 1:3, preferably in the range of from 50:1 to 1:2, more preferably in the range of from 25:1 to 1:0.8. A ratio larger than this range would lead to shorter reaction times, however at the cost of higher exothermic peak and the loss of monitoring the curing with the first and second colour change. Similarly, ratios smaller than 1:3 would lead to reaction times too large for the envisioned application of the curable casting resins as described herein.

The curable casting resin precursor as described herein contains in part (A) and/or part (B) at least one triphenylmethane dye. Triphenylmethane dyes have the effect that they exhibit colour changes upon, e.g. contact with amines, in particular primary amines. In the context of the present disclosure, the ability to these colour changes are exploited in that a first colour change may be observed upon mixing of part (A) and part (B) and a second colour change may be observed after curing of the curable casting resin composition. That is, the worker using the curable casting resin precursor as described herein may monitor and determine whether or not correct mixing of part (A) and part (B) has occurred. Subsequently, he may also be in the position to monitor curing and to determine whether or not curing of the curable casting resin has already taken place. With regard to the application of the curable casting resin and its precursor as described herein for on-site insulation of cable joints and splices, this represents a particular advantage for the worker applying these casting resins and precursors.

In this regard, the term "colour change" as used herein has the common meaning used in the art, i.e. formation of a different colour, loss of original colour or intensification of original colour. Furthermore, the use of triphenylmethane dyes is advantageous in that such dyes usually do not interfere with subsequent curing of the epoxy resins by the amine curing agents. Without wanting to be bound by any kind of theory, it is assumed that dye and amine-based epoxy curing agent(s) are able to reversibly form an unstable reaction product which is of a different colour than the dye itself. As the skilled person appreciates, any kind of triphenylmethane dye useful for the application as described herein may be used. Examples of triphenylmethane dyes useful as indicators as described herein are described in, e.g. "Atlas of Certified Colours for Foods, Drugs and Cosmetics", S. Zuckerman, Encyclopedia of Chemical Technology, Vol. 4, pp. 287-313, copyright 1949 by The Interscience Encyclopedia, Inc. Since it has been found that cationic triphenylmethane dyes are particularly suited for the purposes of the present disclosure, cationic triphenylmethane dyes are preferred. One particular preferred example for a triphenylmethane dye is 4-[[4-(diethyl-amino)phenyl]-(4-diethylazaniumylidenecyclohexa-2,5-dien-1-ylidene) methyl]-6-hydroxybenzene-1,3-disulfonate or its calcium, potassium or sodium salt, preferably the calcium or sodium salt, or Bromothymol Blue (4,4'-(1,1-Dioxido-3H-2,1-benzoxathiole-3,3-diyl)bis(2-bromo-6-isopropyl-3-methylphenol)). The calcium salt of 4-[[4-(diethyl-amino)phenyl]-(4-diethylazaniumylidenecyclohexa-2,5-dien-1-ylidene) methyl]-6-hydroxybenzene-1,3-disulfonate is available under the trade designation Vibracolor Blue FBL 5 from BASF. The sodium salt of 4-[4,4',-bis-diethylamino-α-hydroxy-benzhydryl]-6-hydroxy-benzol-1,3-disulfonic acid is available under the trade designation Patent Blue V from Sigma Aldrich.

Preferably, the at least one triphenylmethane dye is contained in part (A) and/or part (B) of the curable casting resin precursor in an amount of from 0.01 to 2 wt.-%, preferably from 0.01 to 1 wt.-%, more preferably from 0.01 to 0.2 wt.-%, based on the total weight of part (B). In a preferred embodiment of the present disclosure, the at least one triphenylmethane dye is contained in part (A). Containing the at least one triphenylmethane dye in part (A) may have the advantage of constant viscosity, pot life and color intensity, even after prolonged storage at elevated temperatures. In another preferred embodiment of the present disclosure, the at least one triphenylmethane dye is contained in part (B).

Part (B) of the curable casting resin precursor according to the present disclosure further comprises at least one mineral filler. This has the effect of adjusting the viscosity of the part (B) and/or the curable casting resin, yielding a certain mechanical stability and strength of the cured resin, and/or dissipating the exothermic heat created during curing of the resin. Preferably, the at least one mineral filler is from the group of filler materials comprising inorganic oxides, inorganic hydroxides, inorganic oxyhydroxides and metal nitrides. Preferred embodiments include aluminium hydroxide, silica, aluminium oxide calcium carbonate, silicon nitride, boron nitride, aluminium nitride, silicon carbide and glass bubbles. Silica may be amorphous or fumed silica and mixtures with further organic or inorganic substances. Glass bubbles may be hollow glass bubbles, which may further decrease density and/or weight of the composition, which may be advantageous for various applications. Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Dijsseldorf, Germany); AEROSIL R-202 (a hydrophobically fumed silica available from Evonik Industries, Germany); glass-beads class IV (250-300 microns): Micro-billes de verre 180/300 (available from CVP S.A. in France); glass bubbles K37: amorphous silica (available from 3M Deutschland GmbH in Neuss, Germany); MINSIL SF 20 (available from Minco Inc., 510 Midway, Tenn., USA); amorphous, fused silica; and APYRAL 24 ESF (epoxysilane-functionalized (2 wt.-%) aluminium trihydrate) and APYRAL 22 (aluminium trihydrate) available from Nabaltec GmbH in Schwandorf, Germany. Fused silica is available, for example, under the trade designation MINSIL from Minco Inc., Midway, USA. Hollow glass microspheres are available under the trade designation MICROBUBBLES from 3M Company, St. Paul, Minn., USA.

Preferably, part (B) of the curable casting resin precursor as described herein comprises the at least one mineral filler in an amount of from 40 to 80 wt.-%, preferably from 45 to 75 wt.-%, more preferably from 50 to 70 wt.-%, based on the total weight of part (B).

Part (B) also comprises at least one phenolic lipids. Generally, the term "phenolic lipids" is used for a class of natural products composed of long aliphatic chains and phenolic rings. As used herein, this term describes compounds of either natural or preferably synthetic origin composed of long aliphatic chains and phenolic rings. The presence of the at least one phenolic lipid in the curable casting resin and its precursor may have the effect of improved flexibility of the resin compositions even at low temperatures and increased hydrophobicity also of the cured resin obtained therefrom. Preferably, the at least one phenolic lipid is selected from alkylcatechols, alkylphenols, alkylresorcinols and anacardic acids. More preferably, the at least one phenolic lipid is an alkylphenol selected from propylphenol, butylphenol, amylphenol, octylphenol, nonylphenol, dodecylphenol and cardanol-based compounds. Cardanol-based compounds are commercially available as resin modifiers, e.g. under the trade designation NX-2026 or Ultra Lite 2023 from Cardolite Corporation.

It is preferred that the at least one phenolic lipid is contained in part (B) of the curable casting resin precursor in an amount of from 1 to 30 wt.-%, preferably from 2.5 to 25 wt.-%, more preferably from 3 to 20 wt.-%, based on the total weight of part (B).

It may also be preferable to additionally include the at least one phenolic lipid in part (A) of the curable casting resin precursor. In this case, it is preferred that the at least one phenolic lipid is contained in part (A) in an amount of from 5 to 30 wt.-%, preferably from 7.5 to 25 wt.-%, more preferably from 10 to 20 wt.-%, based on the total weight of part (A).

It is further preferred that part (A) of the curable casting resin precursor according to the present disclosure comprises at least one reactive diluent. Reactive diluents are epoxy-containing molecules. The epoxy-based reactive diluent for use herein is not particularly limited. Any epoxy-based reactive diluent commonly known in the art may be used in the context of the present disclosure.

Without wishing to be bound by theory, it is believed that the epoxy-based reactive diluent beneficially impacts, in particular, the viscosity of either or both of part (A) of the curable casting resin precursor and the curable casting resin obtained therefrom.

In a particular aspect of the present disclosure, wherein the epoxy-based reactive diluent for use herein has a saturated or unsaturated cyclic backbone, and preferably comprises glycidyl ether as reactive terminal end portions.

According to a preferred aspect, the epoxy-based reactive diluent for use herein is selected from the group consisting of diglycidyl ether of resorcinol, diglycidyl ether of cyclohexane dimethanol, diglycidyl ether of neopentyl glycol, triglycidyl ether of trimethylolpropane, and any mixtures thereof.

Commercially available reactive diluents for use herein include for example "Reactive Diluent 107" (available from Hexion) and the "Epodil" series (available from Air Products and Chemical Inc., Allentown, Pa., USA) including in particular EPODIL 746, EPODIL 747, EPODIL 748 and EPODIL 757.

When used, preferably, the reactive diluent is contained in part (A) of the curable casting resin precursor in an amount of from 1 to 20 wt.-%, preferably from 3 to 18 wt.-%, based on the total weight of part (A).

The ratio of part (A) to part (B) of the casting resin precursors as described herein is preferably in the range of from 1:1 to 1:2, preferably from 1:1.1 to 1:1.6.

A further object of the present disclosure is a curable casting resin composition, obtained from combining part (A) and part (B) of the curable casting resin precursor as described herein. As already described, the curable casting resin composition may confer desirable properties such as good pot life, being curable at ambient temperature even in the presence of water, good curing speed under the development of acceptable exothermic heat, and properties of the cured composition may comprise good mechanical properties, chemical resistance as well as good electrical insulating properties.

The curable casting resin composition may provide after curing a tensile strength according to DIN EN ISO 527-2 in the range of from 10 to 60 MPa, preferably in the range of from 15 to 55 MPa, more preferably in the range of from 20 to 50 MPa. Additionally, the curable casting composition may provide after curing an elongation at break according to DIN EN ISO 527-2 in the range of from 0.1 to 20%, preferably in the range of from 0.5 to 15%, more preferably in the range of from 1 to 10%. With regard to the electrical properties of the cured casting resin composition, the curable casting resin composition may provide after curing a dielectric constant at room temperature according to IEC 60250 in the range of from 0.5 to 20, preferably in the range of from 1 to 15, more preferably in the range of from 2.5 to 10. The curable casting composition may provide after curing a dielectric constant at 80° C. according to IEC 60250 in the range of from 1 to 30, preferably in the range of from 2.5 to 25, more preferably in the range of from 5 to 20. The curable casting composition may provide after curing a dissipation factor at room temperature according to IEC 60250 in the range of from 0.001 to 0.1, preferably in the range of from 0.01 to 0.05. Furthermore, the curable casting composition may provide after curing a dissipation factor at 80° C. according to IEC 60250 in the range of from 0.005 to 1, preferably in the range of from 0.01 to 0.75, more preferably in the range of from 0.1 to 0.5. Additionally, the curable casting composition may provide after curing a specific volume resistivity at room temperature according to VDE 0303-30 in the range of from $1\times10^{13}$ to $1\times10^{16}$ Ωcm, preferably in the range of from $1\times10^{14}$ to $9\times10^{15}$ Ωcm. The curable casting composition may provide after curing a specific volume resistivity at 80° C. according to VDE 0303-30 in the range of from $1\times10^{9}$ to $1\times10^{13}$ Ωcm, preferably in the range of from $5\times10^{9}$ to $9\times10^{12}$ Ωcm. A curable composition as described herein having at least one, preferably a combination, more preferably all of the above-described properties, is well-suited for an application in on-site insulation of cable joints or splices, which may easily applied by even an untrained worker and provides insulation against moisture, physical impact and provides further electrical insulation. Additionally, the curable casting resin may exhibit a pot life suitable for applications as described herein. That is, the curable casting resin may exhibit a pot life at room temperature according to HD631.1, S.2, 2007 of at least 5 minutes, at least 10 minutes, or even at least 15 minutes. The curable casting resin may further exhibit of less than 80 minutes, less than 60 minutes, or less than 40 minutes. Moreover, the curable casting resin may exhibit an exothermic peak at room temperature according to HD631.1, S.2, 2007 of less than 180° C., preferably less than 170° C., more preferably less than 160° C. This is of particular advantage for the worker applying the curable casting resin and may further avoid damages to structures and equipment surrounding the cable joint and casting resin.

The present disclosure further provides a method of encapsulating metal parts such as cable joints, the method comprising the following steps:
  (a) Providing a curable casting resin precursor as described herein,
  (b) Combining parts (A) and (B) of the curable casting resin precursor so as to form a curable casting resin composition;
  (c) Providing at least one metal part;
  (d) Optionally, providing a cast around at least part of the at least one metal part such as a cable joint;
  (e) Applying the curable casting resin composition to the at least one metal part such as cable joint; and
  (f) Allowing the curable casting resin composition to cure.

The method will now be explained using a cable joint comprising the joint of the metal parts of at least two different cables as a particularly preferred example of the at least one metal part. Combining parts (A) and (B) may be carried out by means of combining one portion of (A) and one portion of (B) into a vessel and preferably mixing the combined parts. Mixing may be achieved by means of stirring the mixture, e.g. by mechanically stirring with an electrical stirrer, a stirring bar or the like. Preferably, mixing may be carried out filling parts (A) and (B) into a transparent plastic vessel such as a plastic bag and mixing the parts by squeezing the vessel, preferably the plastic bag until the parts are thoroughly mixed. This may be observed by a respective colour change of the mixture as described herein. Thus, after obtained the curable casting resin composition as described herein, it is applied to the cable joint and allowed to cure. Preferably, a mould or cast is provided around the cable joint into which the curable casting resin composition is transferred. Allowing the curable casting composition to cure is generally carried out at ambient conditions, that is, in most cases, room temperature. Advantageously, the curing process may be monitored by observing the colour change as described herein. That is, the worker using the curable casting resin precursor as described herein may observe the point in time in which the curable casting resin is satisfactorily cured. This is particular advantageous since the worker may then move the cable joint and/or the cables attached thereto, optionally remove the cast, and continue with other or additional construction work involving the newly insulated cable joint. Other examples for metal parts include electrical conductors and electrical machines.

The curable casting resin precursor according to the present disclosure may easily be stored, shipped, and applied as desired by the user via an application kit, comprising part (A) and part (B) of said curable casting resin precursor in separate containers. Thus, the present disclosure further provides an application kit for insulating cable joints, comprising
  (i) a first container containing part (A) of the curable casting resin precursor as described herein and a second container containing part (B) of the curable casting resin precursor as described herein;
  (ii) a casting chamber/mold dimensioned in a way to provide space for a cable joint and for mixing part (A) and (B) of the curable casting resin precursor such that the cable joint may be covered by a curable casting resin composition obtained from mixing part (A) and (B) of the curable casting resin precursor.

In this regard, it is preferred that the first and second containers and the casting chamber/mold are made of transparent polymeric material. It is understood that there exist a plurality of polymeric materials suited for the application as contemplated herein which are known in the art and easily selected by the skilled person.

The present disclosure further provides a use of the curable casting resin precursor or the curable casting resin composition as described herein for encapsulating metal parts. Preferably, the use described herein of the curable casting resin precursor or the curable casting resin comprises insulating cable joints or splices. Another preferred use of the precursors and casting resins according to the present disclosure comprises encapsulating electrical devices. Encapsulating electrical devices generally comprises electrical insulating the electrical devices.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Examples

Materials Used:

| Product Name | Supplier | Details |
| --- | --- | --- |
| EPON 828 | Hexion | Standard Bisphenol A/epichlorhydrin based epoxy resin |
| DER 351 | | Bisphenol A/F epoxy resin |
| DER 3274 | | Bisphenol A epoxy resin with reactive diluent |
| CUR09370 | 3M | Epoxy curing agent |
| NX-2026 | Cardolite | Cardanol-based resin modifier |
| NX-5608 | Cardolite | Phenalkamine epoxy curing agent |
| Apyral 20x | Nabaltec | Aluminium hydroxide, mineral filler |
| Apyral 22 | Nabaltec | Aluminium hydroxide, mineral filler |
| Silbond 126 EST | Quarzwerke | Surface treated silica, mineral filler |
| Vibracolor Blue FBL 5 | BASF | Calcium salt of 4-[[4-(diethyl-amino)-phenyl]-(4-diethyl-azaniumylidenecyclohexa-2,5-dien-1-ylidene)methyl]-6-hydroxybenzene-1,3-disulfonate |
| Patent Blue V | Sigma Aldrich | Sodium salt of 4-[[4-(diethyl-amino)phenyl]-(4-diethylazaniumylidenecyclohexa-2,5-dien-1-ylidene)methyl]-6-hydroxybenzene-1,3-disulfonate |
| Iragon Blue FBL5-L HFC | BASF | Calcium salt of 4-[4,4'-bis-diethylamino-α-hydroxy-benzhydryl]-6-hydroxy-benzol-1,3-disulfonic acid, dissolved in dipropylene glycol |

Test Methods
1. Tensile Strength.

Tensile strength was determined according to DIN EN ISO 527-2: 2012 (Plastics—Determination of tensile properties—Part 2: Test conditions for moulding and extrusion plastics) on a "Zwick Roell 030" tensile tester using specimen type 1B and a testing speed of 5 mm/min. Specimen were obtained by filling a mixed and degassed resin formulation consisting of Part A and Part B into the respective test specimen mould and curing the resin for 24 h at room temperature, followed by 24 h at 80° C. The specimen were conditioned according to DIN EN ISO 527-1: 2012 prior testing.

2. Elongation at Break.

Elongation at break was determined according to DIN EN ISO 527-2: 2012 (Plastics—Determination of tensile properties—Part 2: Test conditions for moulding and extrusion plastics) on a "Zwick Roell 030" tensile tester using specimen type 1B and a testing speed of 5 mm/min. Specimen were obtained by filling a mixed and degassed resin formulation consisting of Part A and Part B into the respective test specimen mould and curing the resin for 24 h at room temperature, followed by 24 h at 80° C. The specimen were conditioned according to DIN EN ISO 527-1: 2012 prior testing.

3. Pot Life.

Pot life was determined on the basis of the test method described in HD631.1 S2 section 7.2 using a testing volume of 200 mL at 23° C.

4. Exotherm Peak.

Exotherm peak was determined on the basis of the test method described in HD63 1.1 S2 section 7.3 using a testing volume of 200 mL and a "Yokogama DC 100" data collector at 23° C.

5. Dielectric Constant and Dissipation Factor.

Dielectric constant and Dissipation factor were determined according to IEC 60250: 1969 at 50 Hz and 500 V/mm using a "Haefely Type 2914" test cell and a "Megohmmeter LDIC M1500P" dielectric test station. 1 mm thick test plates were obtained by filling a mixed and degassed resin formulation consisting of Part A and Part B into the respective test specimen mould and curing the resin for 24 h at room temperature, followed by 24 h at 80° C. Conductive silver paint was applied to the test plate prior testing.

6. Specific Volume Resistivity.

Specific volume resistivity was determined according to VDE 0303-30: 1993 at 50 Hz and 500 V/mm using a "Haefely Type 2914" test cell and a "Megohmmeter LDIC M1500P" dielectric test station. 1 mm thick test plates were obtained by filling a mixed and degassed resin formulation consisting of Part A and Part B into the respective test specimen mould and curing the resin for 24 h at room temperature, followed by 24 h at 80° C. Conductive silver paint was applied to the test plate prior testing.

Preparation of Part A and Part B

Parts A of the curable adhesive precursor compositions were prepared by combining the ingredients as listed in table 1 using a high speed mixer (DAC 600.2 VAC-P Speedmixer, from Hauschild Engineering) with stirring at 2000 rpm. In a first step the liquid components for part B were mixed together for 1 min. The complete mixtures were again stirred for at least 2 min at 2000 rpm in the high speed mixer to ensure complete dispersion of all ingredients.

TABLE 1 composition of part A (amounts in % by weight)

| Example | DER 351 | DER 3274 | NX 2026 | Iragon Blue FBL5-L HFC |
|---|---|---|---|---|
| 1 | 75 | 25 | | |
| 2 | 80 | | 20 | |
| 3 | 83.3 | | 16.7 | |
| 4 | 100 | | | |
| 5 | 99.7 | | | 0.3 |

Parts B of the curable adhesive precursor composition were prepared according to the same procedure as outlined for Parts A, but using the ingredients as listed in table 2. Solid parts were added one after the other with mixing for 2 minutes at 2000 rpm after each addition. The complete mixtures were again stirred for at least 2 min at 2000 rpm in the high speed mixer to ensure complete dispersion of all ingredients.

Parts A and B described above were mixed using the high speed mixer at 800 rpm for 5 min at reduced pressure of 50 mbar. The mix ratio of Part A:Part B was 1:1.45 for Example 1, 1:1.16 for Example 2, 1:1.08 for Example 3 and 1:1.13 for Example 4.

TABLE 2

Composition of Part B (amounts in % by weight)

| Example | NX 5608 | CUR09370 | Apyral 22 | NX 2026 | Patent Blue V |
|---|---|---|---|---|---|
| 1 | 31 | | 55.2 | 13.8 | |
| 2 | 25.9 | 1.7 | 69 | 3.5 | 0.01 |
| 3 | 30.8 | 3.9 | 61.5 | 3.9 | 0.02 |
| 4 | 28.9 | 8.9 | 53.3 | 8.9 | 0.02 |
| 5 | 22.8 | 7 | 56.1 | 14 | |

Part (A) of Example 5 had a blue color before mixing. After homogenous mixing of part (A) and part (B) for 60 s, the resulting mixture exhibited a homogenous green color. Upon progress of the curing, the green color turned into a dark green and finally, after solidification of the resin, again into blue. Viscosity, pot life and color intensity of example 5 remained on a constant level, even after storage over several weeks at temperatures of up to 65° C.

TABLE 3

Mechanical properties of cured compositions

| Example | Tensile Strength [MPa] | Elongation at break [%] |
|---|---|---|
| 2 | 29 | 1 |
| 3 | 33 | 3 |
| 4 | 40 | 3 |

TABLE 4

Curing Properties of curable casting resin compositions

| Example | Pot life (room temperature) | Peak exotherm (room temperature) |
|---|---|---|
| 1 | 16 min (200 mL) | 136° C. (200 mL) |
| 2 | 17 min (200 mL) | 116° C. (200 mL) |
| 3 | 17 min (200 mL) | 134° C. (200 mL) |
| 4 | 23 min (200 mL) | 157° C. (200 mL) |

TABLE 5

Dielectric constants of cured compositions

| Example | Dielectric constant at room temperature | Dielectric constant at 80° C. |
|---|---|---|
| 1 | 5.4 | 8.4 |
| 2 | 5.1 | 11.2 |
| 3 | 5.3 | 12.8 |
| 4 | 5.3 | 7.1 |

TABLE 6

Dissipation factors of cured compositions

| Example | Dissipation factor at room temperature | Dissipation factor at 80° C. |
|---|---|---|
| 1 | $2.4 \times 10^{-2}$ | $2.2 \times 10^{-1}$ |
| 2 | $2.4 \times 10^{-2}$ | $4.7 \times 10^{-1}$ |
| 3 | $2.2 \times 10^{-2}$ | $5.2 \times 10^{-1}$ |
| 4 | $1.8 \times 10^{-2}$ | $1.1 \times 10^{-1}$ |

TABLE 7

Specific volume resistivity at room temperature

| Example | Specific volume resistivity at room temperature [Ω cm] | Specific volume resistivity at 80° C. [Ω cm] |
|---|---|---|
| 1 | $8.2 \times 10^{14}$ | $9.6 \times 10^{10}$ |
| 2 | $5.8 \times 10^{14}$ | $1.8 \times 10^{10}$ |
| 3 | $8.3 \times 10^{14}$ | $1.5 \times 10^{10}$ |
| 4 | $1.3 \times 10^{15}$ | $9.6 \times 10^{11}$ |

The invention claimed is:

1. A curable casting resin precursor, comprising
(a) a first part (A) comprising:
   (a1) at least one epoxy resin;
(b) a second part (B) comprising:
   (b1) at least one first amine-based epoxy curing agent selected from a phenalkamine,
      the phenalkamine being a reaction product of cardanol, formaldehyde and an amine, and
      the phenalkamine being present in an amount of 10 to 45 wt % with respect to the weight of the second part (B);
   (b2) optionally, at least one second amine-based epoxy curing agent, if present, the at least one second amine-based epoxy curing agent being present in an amount of 1.5 to 10 wt % with respect to the weight of the second part (B);
   (b3) at least one mineral filler;
   (b4) at least one phenolic lipid; and
at least one triphenylmethane dye,
   wherein the at least one triphenylmethane dye is within the first part (A) and/or the second part (B).

2. The curable casting resin precursor according to claim 1, wherein the at least one epoxy resin is based on bisphenol A epoxy resin, bisphenol F epoxy resin, and mixtures thereof.

3. The curable casting resin precursor according to claim 1, wherein the at least one phenolic lipid is selected from alkylcatechols, alkylphenols, alkylresorcinols and anacardic acids.

4. The curable casting resin precursor according to claim 3, wherein the at least one phenolic lipid is an alkylphenol selected from propylphenol, butylphenol, amylphenol, octylphenol, nonylphenol, dodecylphenol, and a cardanol-based compound.

5. The curable casting resin precursor according to claim 1, wherein at least one second amine-based epoxy curing agent is a polyether amido amine.

6. The curable casting resin precursor according to claim 1, wherein the at least one mineral filler is selected from the group of filler materials comprising inorganic oxides, inorganic hydroxides, inorganic oxyhydroxides and metal nitrides.

7. The curable casting resin precursor according to claim 1, wherein the at least one triphenylmethane dye is selected from 4-[[4-(diethyl-amino)phenyl]-(4-diethylazaniumylidenecyclohexa-2,5-dien-1-ylidene)methyl]-6-hydroxy-benzene-1,3-di sulfonate acid and its calcium, potassium or sodium salts or Bromothymol Blue (4,4'-(1,1-Dioxido-3H-2,1-benzoxathiole-3,3-diyl)bis(2-bromo-6-isopropyl-3-methylphenol)).

8. The curable casting resin precursor according to claim 1, comprising:
(a) a first part (A) comprising:
   (a1) at least one epoxy resin in an amount of from 60 to 100 wt.-%, based on the total weight of part (A);
(b) a second part (B) comprising:
   (b3) at least one mineral filler in an amount of from 40 to 80 wt.-%, based on the total weight of part (B);
   (b4) at least one phenolic lipid in an amount of from 1 to 30 wt.-%, based on the total weight of part (B).

9. The curable casting resin precursor according to claim 1, which exhibits a first colour change after mixing of the first part (A) and the second part (B).

10. The curable casting resin precursor according to claim 9, which exhibits a second colour change upon curing.

11. A curable casting resin composition, obtained from combining the first part (A) and the second part (B) of the curable casting resin precursor according to claim 1.

12. A method of encapsulating metal parts, the method comprising the following steps:
providing a curable casting resin precursor according to any claim 1,
combining the first part (A) and the second part (B) of the curable casting resin precursor to form a curable casting resin composition;
providing at least one metal part;
applying the curable casting resin composition to at least part of the at least one metal part; and
allowing the curable casting resin composition to cure.

13. The curable casting resin precursor according to claim 1, wherein the at least one mineral filler is selected from aluminum hydroxide, silica, aluminum oxide calcium carbonate, silicon nitride, boron nitride, aluminum nitride, silicon carbide, and glass bubbles.

14. The curable casting resin precursor according to claim 8, the first part (A) further comprising:
(a4) at least one triphenylmethane dye in an amount of from 0.01 to 2 wt.-%, based on the total weight of the first part (A).

15. The curable casting resin precursor according to claim 8, the first part (A) further comprising:
(a2) at least one phenolic lipid in an amount of from 5 to 30 wt.-%, based on the total weight of the first part (A).

16. The curable casting resin precursor according to claim 8, the first part (A) further comprising:
(a3) at least one reactive diluent in an amount of from 1 to 20 wt.-%, based on the total weight of the first part (A).

17. The curable casting resin precursor according to claim 8, the second part (B) further comprising:
(b5) at least one triphenylmethane dye in an amount of from 0.01 to 2 wt.-%, based on the total weight of the second part (B).

18. The method of claim 12, further comprising providing a cast around at least part of the at least one metal part and applying the curable casting resin into the cast.

* * * * *